Oct. 7, 1958   O. L. PATTERSON   2,855,145
COMPUTING CIRCUITS
Filed July 30, 1951   6 Sheets-Sheet 1

$$E_C = M(E_A - E_B) \qquad M \gg 1$$

$$E_B = \frac{E_H + E_J}{2} \qquad E_A = \frac{E_G}{2}$$

$$E_C = E_J = M\left(\frac{E_H + E_J}{2} - \frac{E_G}{2}\right)$$

$$E_J = \frac{M}{M+2}(E_G - E_H) \rightarrow E_G - E_H$$

INVENTOR.
OMAR L. PATTERSON
BY
ATTORNEYS.

Oct. 7, 1958     O. L. PATTERSON     2,855,145
COMPUTING CIRCUITS

Filed July 30, 1951     6 Sheets-Sheet 2

INVENTOR.
OMAR L. PATTERSON
BY
ATTORNEYS $$E_Q = K \frac{E_{P'}}{E_M E_N}$$

$$q = C \cdot K \cdot E \cdot F(E_X)$$
$$C_X = \frac{q}{E} = C \cdot K \cdot F(E_X)$$

INVENTOR.
OMAR L. PATTERSON
BY
ATTORNEYS.

INVENTOR.
OMAR L. PATTERSON $E_B = K E_C$ $$E_C = \frac{1}{\frac{1}{\mu} + K} E_A$$

INVENTOR.
OMAR L. PATTERSON
BY
ATTORNEYS.

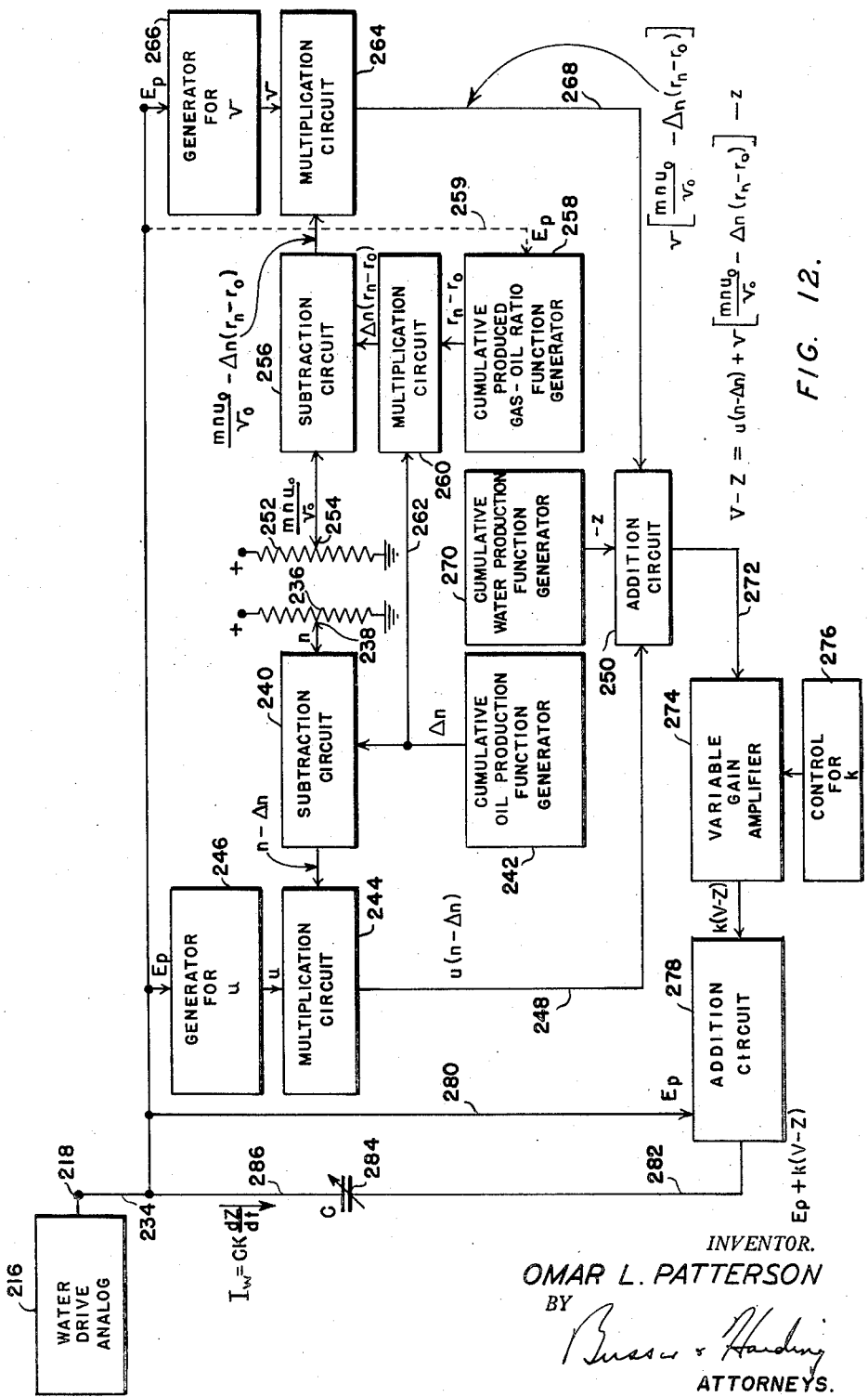

United States Patent Office 2,855,145
Patented Oct. 7, 1958

2,855,145

COMPUTING CIRCUITS

Omar L. Patterson, Media, Pa., assignor to Sun Oil Company, Philadelphia, Pa., a corporation of New Jersey Application July 30, 1951, Serial No. 239,279

8 Claims. (Cl. 235—61)

This invention relates to computing circuits and has particular reference to the provision of circuits for use in analogs and other computing devices. As will become evident hereafter, certain of the circuits have considerably broader fields of application.

This application is in part a continuation of my prior applications Serial Numbers 130,270 and 196,480, now Patent Nos. 2,727,682 and 2,788,938, respectively, filed respectively, November 30, 1949 and November 18, 1950. Claimed also herein are certain elements of the application of Patterson and Yetter, Serial Number 239,278, now Patent No. 2,793,320, filed July 30, 1951.

Electronic computing circuits are frequently only approximate in their computing functions and, in particular, are usually sensitive to voltage variations and changes in characteristics of component elements particularly thermionic tubes. Accordingly, using circuits heretofore known, computations could be carried out to only a very limited degree of accuracy.

The present invention provides various computing circuits of high accuracy and very substantial independence of tube characteristics. As will appear hereafter, there is provided a high gain differential amplifier which serves as an element of various novel circuits for performing arithmetical and other mathematical processes. The use of this high gain differential amplifier is particularly responsible for the accuracy of the computations involved and their independence of tube characteristics.

One object of the invention relates to the provision of a subtraction circuit of high accuracy.

Another object of the invention relates to the provision of differentiating, integrating and addition circuits which, in particular, involve the subtraction circuit.

Still other objects of the invention relate to the provision of accurate multiplying and dividing circuits.

Another object of the invention relates to the provision of a time gated meter circuit which is capable of periodically sampling repetitive wave forms to determine amplitudes of such forms at particular phases of their recurrence cycles.

Another object of the invention relates to the provision of an impedance which may be controlled as a function of a potential or of time so as to vary in accordance with the output of a function generator. More particularly, there is provided a functional capacitance or an arrangement in which a charge may be functionally varied in dependence on an independent variable represented by a potential.

Still another object of the invention is the provision of variable impedances of high value. In particular, in accordance with this phase of the invention, there may be provided continuously variable capacitances of high capacity values far exceeding those obtainable with mechanically variable condensers.

Another object of the invention relates to the provision of a water drive network for an oil reservoir analyzer involving the utilization of such continuously variable high value capacitances.

Still another object of the invention relates to the provision of an oil reservoir analog obeying the material balance equation, taking into account dissolved gas, such analog utilizing various of the computing circuits indicated above.

A further object of the invention relates to an improved generator of rectangular waves of constant and equal amplitude.

These and other objects of the invention, particularly relating to details of construction and operation, will become apparent from the following description read in conjunction with the accompanying drawings, in which:

Figure 12 is a block diagram showing the association of various computing elements to provide an oil reservoir analyzer.

As will appear more clearly hereafter, a group of computing circuits of high accuracy and independence of tube characteristics may be provided using as a basic element a high gain differential amplifier. Such a differential amplifier will first be described.

Figure 1:
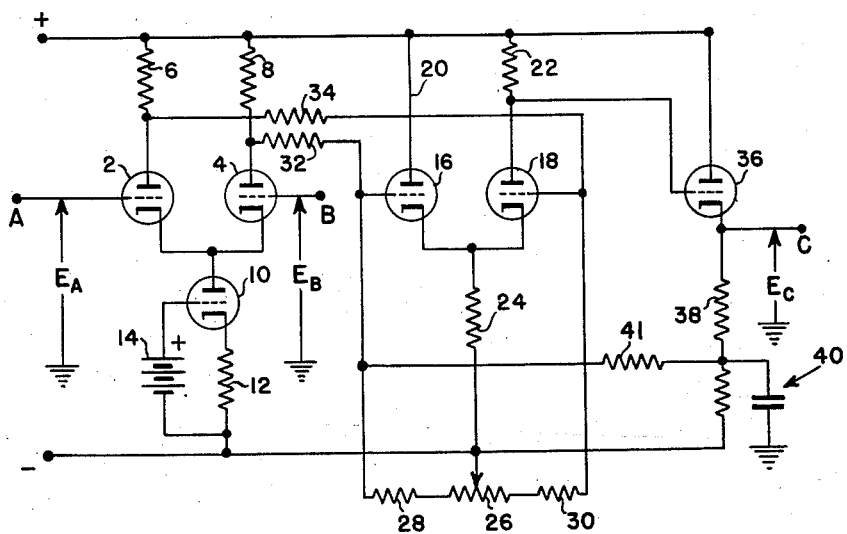
Figure 1 is a wiring diagram of a high gain differential amplifier used to form an element of various computing circuits.

A preferred form of high gain differential amplifier is illustrated in Figure 1 and is of the type described in "Vacuum Tube Amplifiers," volume 18, Radiation Laboratory Series, page 485, McGraw-Hill, 1948. It will be noted that this differential amplifier is, in many respects, similar to that disclosed in my application, Serial No. 196,480 now Patent No. 2,788,938. It involves an improvement thereover in the provision of a constant current triode.

A pair of triodes 2 and 4 have their grids connected to the input terminals A and B. These triodes are provided with anode load resistors 6 and 8 and their cathodes are connected together and to the anode of a triode 10 arranged in a cathode follower circuit, there being provided the cathode load resistor 12. A battery 14 or other source of fixed potential is connected between the remote end of the cathode resistor 12 and the grid of triode 10.

The grids of a pair of triodes 16 and 18 are respectively connected through resistances 32 and 34 to the anodes of triodes 4 and 2. The anode of triode 16 is connected directly to the positive potential supply line. The anode of triode 18 is connected to the same supply line through a load resistor 22. The cathodes of triodes 16 and 18 are connected to each other and to a common cathode load resistor 24 which is, in turn, connected to a negative potential supply line. To this line there is also connected the contact of a potentiometer 26 which is connected respectively through resistances 28 and 30 to the grids of triodes 16 and 18. An output triode 36 is connected in a cathode follower circuit, its cathode being connected to the negative potential supply line through a resistor 38 and a resistance-capacitance network indicated at 40. Feedback is provided through resistance 41 to the grid of triode 16. The grid of triode 36 is connected to the anode of triode 18 and the anode of triode 36 is connected to the positive potential supply line. The output terminal C is connected to the cathode of triode 36.

With a balancing adjustment properly made at potentiometer 26, the action of this differential amplifier is to provide at the output termnial C a potential $E_C$ which is related to the input potentials at terminals A and B, namely, $E_A$ and $E_B$ in accordance with the expression given below the circuit diagram in Figure 1. By virtue of the amplification which is provided in the circuit, the constant $\mu$ has a value greatly exceeding unity and, in fact, with a proper choice of circuit constants, this factor may have a value as high as 10,000.

In the case of the differential amplifier circuit illustrated and described in said Patterson application, Serial No. 196,480, the cathodes of the triodes corresponding to 2 and 4 are connected to the negative supply line through a resistor. When such a connection is made, the expression for $E_C$ contains an additional term involving the sum of the potentials $E_A$ and $E_B$. This common mode of these potentials is substantially completely eliminated by the provision of the triode 10 and its connections in place of a fixed resistance, the action of this triode being to provide a constant total current from the cathodes of triodes 2 and 4. As will be evident, this constant current condition results from the fact that the cathode potential of triode 10 with respect to the lower end of resistor 12 is maintained substantially constant by the provision of the battery 14 the positive terminal of which is connected to the grid of triode 10. It will be evident, therefore, that if the triodes 2 and 4 are similar in their characteristics, as they desirably should be, a simultaneous change of potential of the grids of both the same sense and amount will result in no change of the currents through the load resistors 6 and 8 and, consequently, no output signals to the grids of the triodes 16 and 18. When, therefore, the triodes 2 and 4 are similar to each other and the triodes 16 and 18 are also similar to each other, and minor differences are subjected to substantial elimination by adjustment at potentiometer 26, the expression given below the circuit diagram holds to a high degree of accuracy and the output potential is extremely sensitive to differences between the input potentials. As will appear hereafter, this condition may be utilized in securing a high precision of equality between various potentials, in view of the high value of the factor $\mu$. The high numerical value of this factor may be also utilized to secure ratios, as will appear hereafter, which are very nearly equal to unity.

A highly important feature of the differential amplifier as a basic computer element, especially for long time operation, is mutual cancellation of effects of heater voltage variation and "aging" of tube characteristics.

As will be presently shown, the high gain differential amplifier of Figure 1 has quite general utility as an element of various circuits of a calculating nature. The high gain differential amplifier illustrated in Figure 1 may be made up as a unit provided with the input terminals A and B and the output terminal C and may be incorporated bodily in a large number of circuits.

Figure 2:
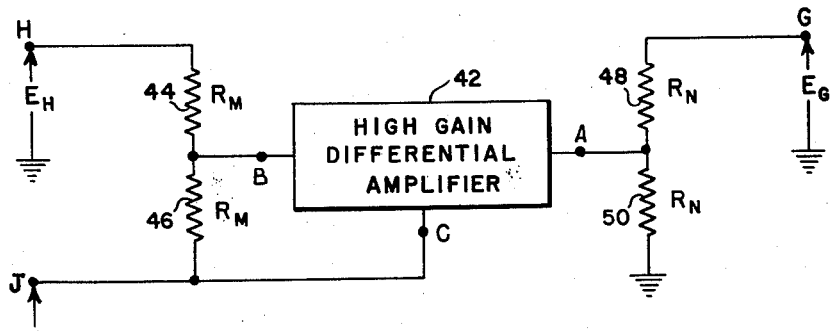
Figure 2 is a diagram showing a high accuracy subtraction circuit involving the use of the high gain differential amplifier of Figure 1.

One such circuit of very considerable utility is the subtraction circuit illustrated in Figure 2 which, in itself, may be made up and involved as a unit in further circuits.

In this subtraction circuit the high gain differential amplifier of Figure 1 is indicated at 42, its terminals A, B and C being indicated in Figure 2 to correspond with those in Figure 1. The terminal B is connected to the junction of a pair of resistors 44 and 46 which initially may be considered to have the same resistance value $R_M$. The terminal A is similarly connected to the junction of a pair of resistors 48 and 50 which may also be assumed to have the same resistance value $R_N$. The upper end of resistor 48 is connected to a terminal G, while the lower end of resistor 50 is grounded. The upper end of resistor 44 is connected to a terminal H, while the lower end of resistor 46 is connected both to the terminal C and an output terminal J. Terminals G and H constitute input terminals for the subtraction circuit. That the output potential $E_J$ appearing at terminal J is very precisely equal to the difference of the input potentials $E_G$ and $E_H$ appearing at terminals G and H will be evident from consideration of the expressions given below the circuit diagram in Figure 2. When the value of $\mu$ is very large, as previously described, it will be evident that the fractional factor involved in the last line of the expressions is very nearly equal to unity. Accordingly, an output potential is provided which is substantially equal to the difference of the input potentials. It will be evident that, even though the value of $\mu$ may vary from one high gain differential amplifier to another, or during the use of an amplifier because of changes in tube characteristics, the subtraction circuit output is highly independent of any such variations of operating characteristics of the differential amplifier. The circuit is also capable of handling a very wide range of both positive and negative potentials.

In particular, it is to be noted that this subtraction circuit does not involve any additive term derived from tube potentials or other source as do subtraction circuits, heretofore known. This fact is particularly important in uses of the subtraction circuit for integration or differentiation, as presently described.

While equality of the resistors of the two pairs illustrated in Figure 2 has been assumed and is necessary for true subtraction, it will be evident that various factors may be introduced if these resistances are not so paired while, nevertheless, there will be secured an output having definite numerical relationship to the inputs and highly independent of the characteristics of the tubes of the differential amplifier.

As has been noted, the subtraction circuit just described is of utility as an element of various other calculation type circuits. Illustrations appear in Figures 3, 4 and 5.

Figure 3:
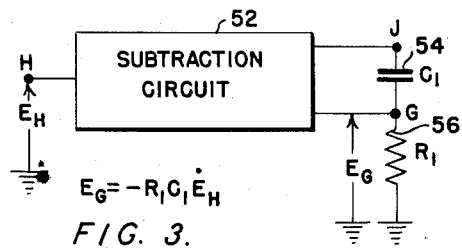
Figure 3 is a wiring diagram illustrating a differentiating circuit of high accuracy.

Figure 3 illustrates a very accurate differentiating circuit in which the subtraction circuit of Figure 2 is illustrated at 52, the terminals G, H and J of the subtraction circuit being indicated in correspondence with those in Figure 2. A condenser 54 is connected between the terminals G and J and a resistor 56 is connected between the terminal G and ground. If a potential is introduced at H having the value $E_H$, there will appear at the terminal G a potential given by the equation appearing below the circuit diagram in Figure 3.

It may be noted that, in contrast with differentiating circuits heretofore known which provide only approximations to precise differentiation and are subject to tube characteristics, supply voltage fluctuations, and the like, the present differentiating circuit is highly independent of such matters and is very precise.

Figure 4:
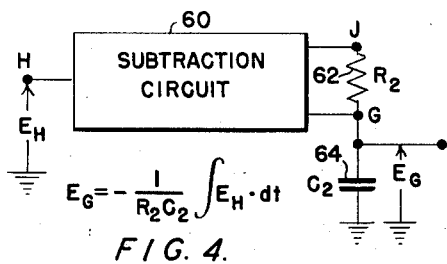
Figure 4 is a wiring diagram of an integrating circuit of high accuracy.

Figure 4 similarly illustrates an integrating circuit in which the subtraction circuit of Figure 2 is provided at 60 and terminals G and J are connected by a resistance 62 while terminal G is connected through condenser 64 to ground. Consideration of the circuit of Figure 4 will reveal that there will appear a potential $E_G$ at the output terminal given by the expression below the circuit diagram in Fig. 4. If a constant of integration is required (as is usual) a potential source may be interposed in the output circuit in various fashions.

A high accuracy of integration by the circuit of Figure 4 is provided and it will, accordingly, be evident that an accurate linear sweep generator may be secured if at terminal H there is applied a constant potential $E_H$. The linearity of the sweep thus provided is much more precise than provided by so-called linear sweep generators heretofore known. Like the differentiating circuit, this integrating circuit is quite independent of tube characteristics and voltage supply variations. It has high stability of direct potential level and consequently may perform long time integrations, unattainable by feedback type or Miller integrators.

It may be noted that the condenser 54 in Figure 3 and the resistor 62 in Figure 4 are connected between terminal G and terminal J. If such condenser or resistor is connected between terminal H and terminal J, the result will be the solution of a linear differential equation of first order with constant coefficients and having a second member which is a function of time. The solution of such an equation, however, is not generally of interest inasmuch as such an equation can usually be more simply solved merely by the transient energization of an impedance network.

Figure 5:
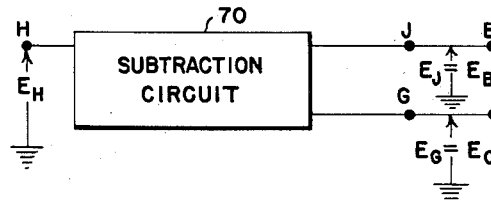
Figure 5 is a diagram showing the elements of an addition circuit including as components the subtraction circuit of Figure 2 and the high gain differential amplifier of Figure 1.

To illustrate generality of the applicability of the high gain differential amplifier and the subtraction circuit, there is illustrated in Figure 5 an arrangement of these elements capable of providing addition to a high degree of accuracy, though it may be noted that, generally speaking, addition may be more simply accomplished than by the use of such a circuit. The subtraction circuit is indicated at 70 and the high gain differential amplifier at 72. If terminals B and J of the two circuits are connected, and terminals C and G are also connected, then it will follow that the potential $E_G$ appearing at terminals G and C will be, to a high degree of accuracy, equal to the sum of the potentials $E_A$ and $E_H$ appearing at terminals A and H, respectively. The fractional factor appearing in the expression below the diagram in Figure 5 will, of course, be very nearly unity when the amplification is large.

Figure 6:
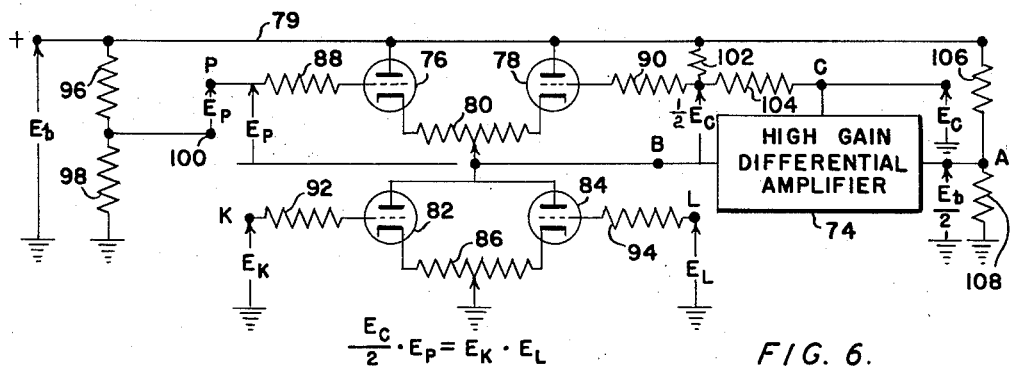
Figure 6 is a multiplication and division circuit utilizing the high gain differential amplifier of Figure 1.

Multiplication and/or division may be effected through the use of the circuit illustrated in Figure 6, the high gain differential amplifier of Figure 1 being indicated at 74.

A pair of triodes 76 and 78 have their anodes connected to a positive potential supply line 79 the potential of which will be designated $E_b$. The cathodes of these triodes are connected to the ends of the resistance of a potentiometer 80, the contact of which is connected to the anodes of the triodes 82 and 84 of a second pair, the cathodes of which are connected to the ends of a potentiometer 86, the contact of which is grounded. Equal resistances 88, 90, 92 and 94 are connected to the grids of the respective triodes and join them to various terminals. These resistances should have quite large resistance values, for example, ten megohms. The resistance 88 connects the grid of triode 76 to a terminal P. The resistance 92 connects the grid of triode 82 to a terminal K. The resistance 94 connects the grid of triode 84 to terminal L.

A pair of equal resistances 96 and 98 connect the positive supply line 79 to ground to provide at a terminal 100 a potential which is one-half the potential of the positive supply line. A pair of equal resistances 102 and 104 connect the positive potential supply line 79 to the terminal C of the high gain differential amplifier 74. The junction of resistances 102 and 104 is connected to the grid of triode 78 through the high resistance 90. Terminal B of the differential amplifier is connected to the contact of potentiometer 86. Terminal A of the differential amplifier is connected to the junction of equal resistances 106 and 108 which are connected between the positive supply line 79 and ground to provide at their junction a potential equal to one-half the potential of the supply line.

The triodes 76, 78, 82 and 84 are desirably of the same type and of closely similar characteristics. The resistances involved at potentiometers 80 and 86 are small and the grids of the triodes are either slightly positive or negative with respect to their cathodes under operating conditions depending upon the tube type used. As is known, for low absolute values of potential of a grid with respect to the cathode for which grid current flows and for low grid current, an exponential relationship between the grid current and grid-cathode potential exists. If each of the grid input resistors is large, as stated above, and each effective cathode resistor is small, it may be readily seen that the grid-cathode potential of each of the triodes is, to a good degree of accuracy, proportional to the logarithm of the input potential plus a constant dependent almost solely on the grid input resistance.

As will be evident from the circuit arrangement, the sum of the currents flowing through the triodes 76 and 78 is equal to the sum of the currents flowing the triodes 82 and 84. Assuming first identical characteristics of the triodes and location of the potentiometer contacts at the centers of resistances 80 and 86, and assuming further equality of resistances at 80 and 86, it will be noted that the function of the differential amplifier 74 is to maintain at terminal B the fixed potential which exists at terminal A and which is one-half the potential of the positive supply line. The differential amplifier enforces this condition by providing at terminal C a control of the potential of the grid of triode 78. The potential to ground existing at the junction of the equal resistances 102 and 104 will be noted to be one-half the potential to ground appearing at the terminal C plus one-half the potential of the positive supply line above ground. Accordingly, the potential which is enforced between the junction of resistances 102 and 104 and terminal B of the differential amplifier is one-half the potential at terminal C. Noting that the effective input potential $E_P$ at terminal P is referred to terminal 100 which in turn is one-half the potential of the positive supply line above ground, it will be evident that the enforced conditions are as given in the equation below the circuit diagram of Figure 6, i. e., the product of the effective input potentials to the triodes 76 and 78 is equal to the product of the input potentials to the triodes 82 and 84. What are referred to as the effective input potentials to triodes 76 and 78 are, of course, the potentials measured above the datum furnished by the terminal 100 and terminal B of the differential amplifier. The result is, accordingly, that terminal C provides an output which is proportional, with a factor of 2, to the product of the potentials $E_K$ and $E_L$, divided by the potential $E_P$.

It will be noted that in the foregoing circuit the plate voltages are held substantially constant and furthermore the sum of the currents through the upper triode pair is always equal to the sum of the currents through the lower triode pair. Consequently, both the upper and lower pairs are operating under substantially identical conditions of input potential products. A change of heater voltage or drift in tube characteristics tends to cancel out. Reference was made above to the use of triodes of substantially identical characteristics. While this is desirable, it is not essential and the adjustments at potentiometers at 80 and 86 may be made to take care of differences in the tubes and in addition may be used to provide adjustment of exponents factors.

While only two tubes are illustrated in Figure 6 in each of the upper and lower groups, it will be evident that, if desired, additional tubes may be arranged in parallel with these to provide additional factors appearing in either the numerator or denominator of the value of the output potential, or in both. Thus, the quotient of any number of factors may be provided. Desirably, however, the number of tubes used should be equal in the upper and lower groups to provide substantially identical operating characteristics; but, obviously, this introduces no difficulty inasmuch as any one or more of the tubes may have a constant potential input which will then appear merely as a scale factor in the result.

The circuit of Figure 6 is particularly desirable for multiplication in which case $E_P$ will be merely a constant potential and will appear as a scale factor in the result. While the circuit may be used for division, as described, there is involved the situation that the potential $E_P$ must be applied above the relatively high potential of the terminal 100 rather than above ground. Consequently, for division, it is preferred to use a circuit such as will now be described with reference to Figure 7 in which all input potentials are applied with respect to ground.

Figure 7:
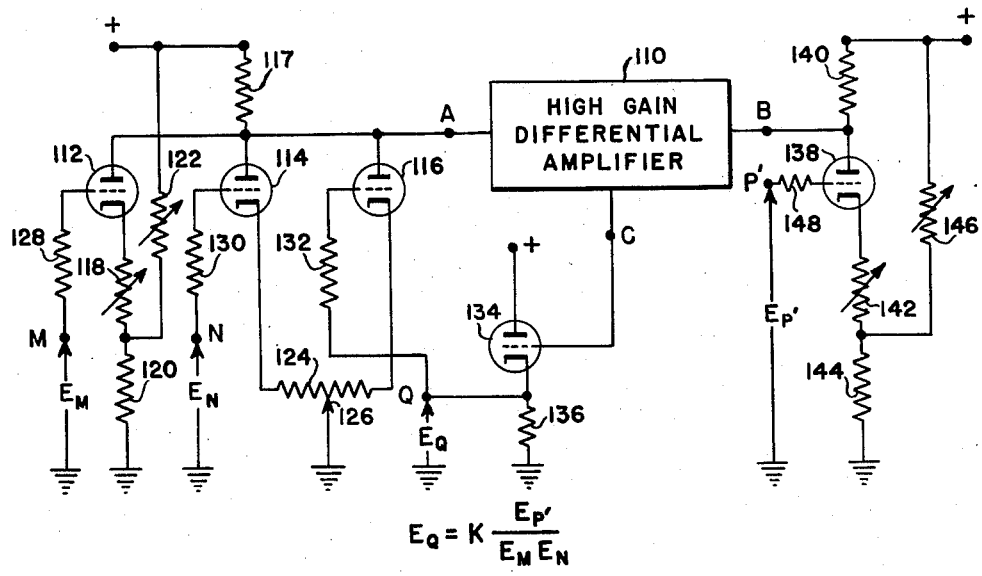
Figure 7 is a wiring diagram illustrating another multiplication and division circuit of high accuracy.

In Figure 7, there is shown a dividing circuit which has various features of operation in common with the multiplying circuit of Figure 6 but which is more adaptable to performance of division. The high gain differential amplifier of Figure 1 is indicated at 110. Three triodes 112, 114 and 116 have their anodes connected together and through a common resistance 117 to the positive potential supply line. The cathode of triode 112 is connected to ground and to the positive potential supply line through the arrangement of variable resistors 118 and 122 and fixed resistor 120. The cathodes of triodes 114 and 116 are connected to the ends of the resistance 124 of a potentiometer having its variable contact 126 grounded. High resistances 128, 130 and 132 connect the grids of the respective triodes to terminals M, N and Q. A triode 134 in a cathode follower circuit has its cathode connected to terminal Q and connected to ground through the cathode load resistor 136. The grid of triode 134 is connected to the differential amplifier terminal C. The anodes of triodes 112, 114 and 116 are connected to the terminal A of this amplifier. The terminal B of the amplifier is connected to the anode of triode 138 which anode is connected through resistor 140 to the positive potential supply line. The cathode of triode 138 is connected to ground and to the positive potential supply line through the arrangement of variable resistors 142 and 146 and fixed resistor 144 in the fashion previously described. The grid of triode 138 is connected to terminal P' through high resistance 148.

Considering what has been previously discussed, it will be noted that the various triodes 112, 114 and 116 and 138 are connected in logarithmic output arrangements as in the case of the triodes 76, 78, 82 and 84 of Figure 6. The grid input resistors are of very high and equal values, the triodes being of the same type, and the triodes 112, 114 and 116 having their anodes loaded by a common resistor 117. In all of these triodes, the cathode to ground connections have relatively low resistances.

Considering the circuit and the operation of the differential amplifier, it will be evident that the differential amplifier will maintain substantially equal the logarithmically derived potentials appearing at A and B. At the terminal A there will appear a potential proportional to the negative logarithm of the product of the potentials at terminals M, N and Q. At the terminal B there will similarly appear the negative logarithm of the potential appearing at terminal P'. The potentials $E_M$, $E_N$ and $E_{P'}$ at the terminals M, N and P' may be considered arbitrarily determined from some external source. Through terminal C and the cathode follower arrangement of triode 134 the potential $E_Q$ at terminal Q is automatically adjusted so that, as an end result, this potential $E_Q$ will be given as the quotient of potential $E_{P'}$ by the product of the potentials $E_M$ and $E_N$ multiplied by a constant, as indicated in the equation given below the diagram in Figure 7.

It will be evident that, instead of a single triode 138, there may be provided at the right-hand side of the differential amplifier any desired number of triodes connected similarly to the left-hand triodes of Figure 6 and having their anodes provided with a common anode resistor and connected to the terminal B. Similarly, additional triodes may be provided to the left of the amplifier with their anodes connected to the terminal A. The result would obviously be even more generally involving the provision of an output potential equal to the quotient of one product of potentials by another product of potentials. The operation of Figure 7 may be readily followed by considering the following:

Assume that the potential $E_{P'}$ is fixed and that, for example, the potential $E_M$ rises. The result would then be a decrease in potential at terminal A, a magnified decrease of potential at terminal C, a corresponding decrease of potential at terminal Q, and an increase of potential at terminal A tending to balance the original decrease of potential at this terminal due to the amplification occurring in the differential amplifier. The result, therefore, would be to maintain the product of potentials at terminals M, N and Q constant and equal to the potential at terminal P'. Assuming alternatively that the potential at A is constant and that the potential at B drops due to a rise in potential at terminal P', the result would be a rise in potential at terminal C, a corresponding rise at terminal Q and a drop at terminal A to bring the potential at terminal A to the value of the potential at terminal B. Evidently, therefore, the variation of the value of the product potential $E_{P'}$ will result in a corresponding variation of potential $E_Q$ to maintain conditions as previously indicated. The net result is that the potential at $E_Q$ corresponds to a quotient as described above.

It may be noted that, under some circumstances, it is not necessary actually to introduce the product potential $E_{P'}$, for example, if it is merely desired to have the product of the potentials $E_M$, $E_N$ and $E_Q$ constant at some value which may, for example, be secured at a zero time. In such case, it would only be necessary to fix the potential at terminal B at some definite value corresponding, of course, to a logarithm of some fictitious potential. Such an arrangement will be found to be provided in said Patterson application, Serial No. 196,480, now Patent No. 2,788,938.

Extensions of the circuits of Figures 6 and 7 to the matters of obtaining powers, either fractional or integral, of potentials and, in particular, for extraction of roots, will be obvious from the above, there being required only common controls of a plurality of the input elements with proper adjustments of the logarithmic constants.

In summary of the foregoing, it will be evident that there are provided by the arrangements just described circuits for the carrying out of the elementary arithmetical processes of addition, subtraction, multiplication and division, not to mention the raising of potentials to powers and extraction of roots thereof. Furthermore, there have been described circuits for differentiation and integration to a high degree of accuracy which circuits, of course, by suitable cascading, may provide multiple differentiation and multiple integration. Since various input potentials may be provided by relatively simple function generators, or quite general and elaborate potentials may be provided by function generators for example of the types described in Patterson application, Serial No. 188,291, filed October 4, 1950, and Patterson and Yetter application, Serial No. 239,278, now Patent No. 2,793,320 filed July 30, 1951, it will be evident that these various circuits may be combined to provide calculating devices or analogs of great complexity with, nevertheless, extremely high precision inasmuch as the various circuit elements described above are capable of giving results to high precision. It will be evident that this high precision stems largely from the use of the high gain differential amplifier of Figure 1 which introduces an amplification factor of such magnitude as to insure, in some instances, a high degree of equality of a pair of compared potentials, and, in others, factors which are very close to unity, both of these ends being secured quite independently of the characteristics of operation of the thermionic tubes which are involved.

Figure 8:
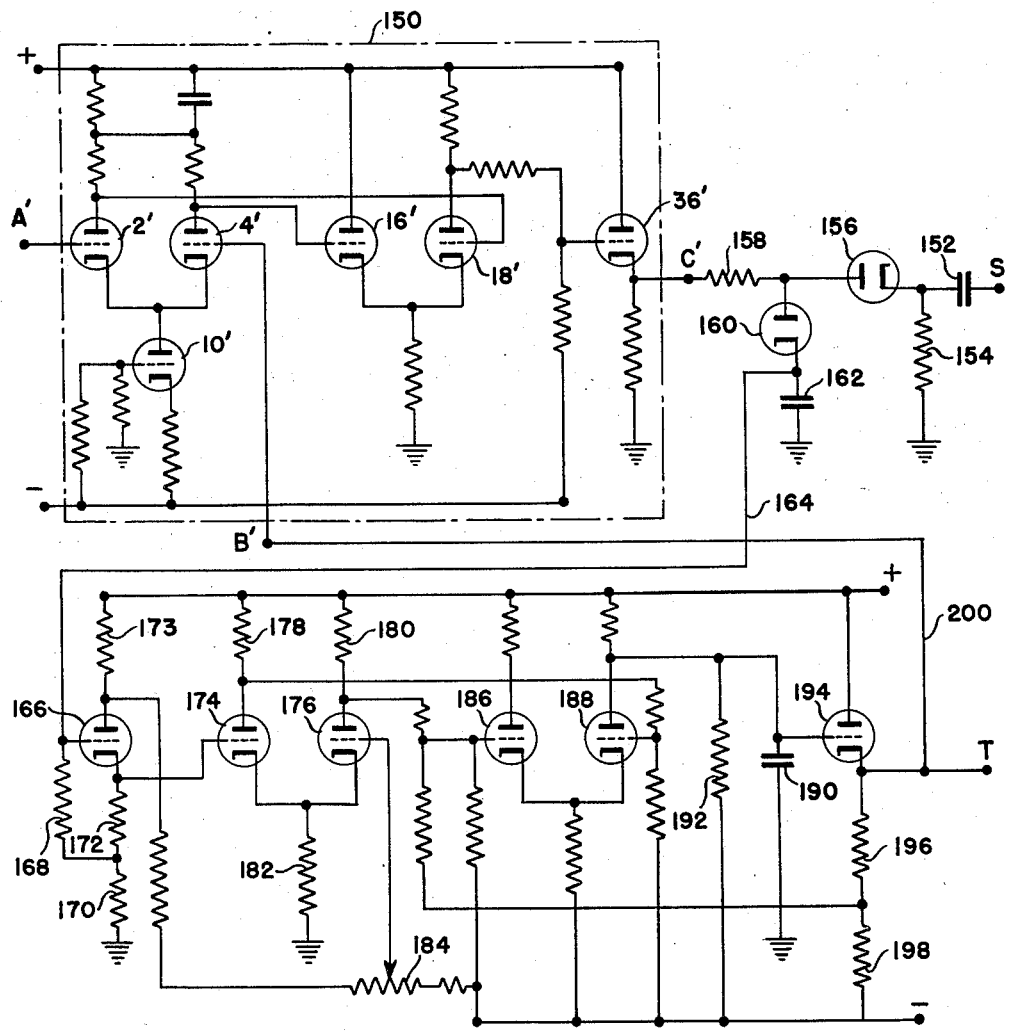
Figure 8 is a wiring diagram showing a time gated meter.

The differential amplifier has further uses of which one is shown in Figure 8. The circuit of this figure provides what may be called a time gated meter for the purpose of providing an output at some particular phase of a repetitive waveform which may vary gradually through successive cycles, the output being a measure of the amplitude of the waveform at that phase. Gated meters of this general type are described in the Patterson applications, Serial Nos. 188,291 and 196,480, now Patent No. 2,788,938, referred to above. The gated meter arrangement shown in Figure 8, however, has substantial advantages of almost complete independence of power supply potentials and of gating pulse width and is capable of providing outputs equal to the input waveform at the time of gating within an accuracy of about 0.025 percent of full scale. Again, in this circuit, use is made of the ability of the high gain differential amplifier to emit greatly magnified signals upon the existence of slight differences between potentials to be compared.

The portion of the circuit of Figure 8 included within the block indicated at 150 constitutes a high gain differential amplifier which is very similar to the amplifier shown in Figure 1 but is detailed circuitwise since it shows some slight differences in connections of various triodes.

The construction and operation of the differential amplifier 150 will be clear by comparing it with that shown in Figure 1, the various triodes being correspondingly numbered with primes appended. It will be noted that the constant current triode 10' has the fixed potential of the grid provided by a resistor arrangement between ground and the negative potential supply line. While the current may thus not be maintained as constant as by the use of a battery, there is sufficient degree of constancy obtained to eliminate substantially the common mode for the purposes of the gated meter involved in the circuit presently under discussion. Fine balancing between the triodes 16' and 18' is also omitted. The terminals A', B' and C' in Figure 8 correspond to A, B and C of Figure 1. The periodically repetitive potential which is to be sampled at a particular phase of its waveform is introduced at terminal A'. A positive gating pulse is introduced at terminal S. This pulse, as will be evident from consideration of the prior applications last mentioned, is timed with respect to the zero of time so as to occur at the same instant after the origin time of each repetitive cycle of a group being sampled. The pulse, desirably, for fine sampling of the waveform, should be of quite narrow width, and, generally, such a pulse would have a duration of the order of one microsecond for repetition frequencies of the order of 250 cycles. The present circuit is designed to give accurate results substantially independently of variations of width of the gating pulse, and it is consequently unnecessary to provide a gating pulse of accurately timed duration. Of course, if the gating pulse is of a width amounting to a substantial fraction of the period of the waveform, the amplitude of the waveform could change substantially during the duration of the pulse and, therefore, the output of the circuit would amount only to an average of the value of the waveform during the pulse duration. To the extent of measuring this average, however, the output would be accurate as compared with other gating circuits in which the output would vary in dependence upon the gate pulse width even if, throughout the duration of the pulse, the input potential was the same.

The effective gating pulse in the present instance is a positive one which is applied from any suitable source, such as a monostable multivibrator, through condenser 152 to the cathode of the diode 156, the cathode being connected to ground through a resistor 154 of relatively low resistance value. The anode of diode 156 is connected to the terminal C' through a resistor 158 and is connected to the anode of a diode 160 the cathode of which is connected to ground through a condenser 162. Connection 164 runs from the ungrounded side of condenser 162 to the grid of a triode 166, the grid of this triode being connected through resistor 168 to the junction of a pair of resistors 170 and 172 connected between the cathode of triode 166 and ground. This triode is provided with an anode load resistor 173. A high gain amplifier arrangement is provided by triodes 174, 176, 186 and 188. The anodes of triodes 174 and 176 are connected through anode resistors 178 and 180 to the positive supply line. Their cathodes are connected together and to the ungrounded end of a resistor 182. Signals from the anodes of triodes 174 and 176 are delivered to the grids of the triodes 188 and 186. From the anode of the triode 188, the signals are delivered to the condenser 190, one side of which is grounded. Between the ungrounded side of condenser 190 and the negative potential supply line there is a resistor 192. The ungrounded side of condenser 190 is connected to the grid of triode 194 in a cathode follower circuit, there being provided the cathode resistors 196 and 198 in series. The cathode of triode 194 is connected to the output terminal T and through line 200 to the terminal B' of the differential amplifier.

The operation of the gated meter will be apparent from the following:

Assume first a particular potential at terminal B' corresponding to the potential of the cathode of triode 194 which potential will be approximately, but less than, that of the condenser 190. If, now, a waveform is applied at terminal A', a signal representative of the difference of potential between terminal A' and B' will be produced at C', the magnitude of this signal increasing as the magnitude of the signal at A' increases. During the period of absence of a positive pulse at the terminal S, the diode 156 will be conducting and the output from the terminal C' will be effectively grounded at the right hand end of resistance 158 through resistance 154. When, however, a positive gating pulse of sufficient magnitude occurs at terminal S, the magnitude being greater than the highest potential which may be expected to appear at terminal C', the diode 156 will become nonconductive and, consequently, current will flow through diode 160 to provide charging of the condenser 162. The condenser 162 and the associated resistance arrangement at 168 and 170 provides a sufficient integrating action to prevent substantial discharge of the condenser during the interval between repetitive cycles of the input waveform.

Direct amplification of the potential of condenser 162 occurs through the amplifier arrangement involving triodes 166, 174, 176, 186 and 188 providing an amplified charging of condenser 190 which is also associated with a resistor 192 so as to provide an integrating action serving to maintain the condenser 190 against substantial discharge through the duration of a single period of the waveform being sampled. A potential corresponding to, but slightly less than, that of condenser 190, which may, accordingly, be regarded as substantially fixed over the duration of a cycle, is applied through connection 200 to the grid of triode 4'. The result is that, through a period of several cycles, the potential of the grid of triode 4' will become adjusted to substantial equality with the potential appearing at terminal A' at the interval of duration of the gating pulse. It will be noted that if the potential of the grid of triode 4' is less than that of A' at the time of gating the circuit arrangement is such as to raise the potential of the grid of triode 4' toward that of A'. If, however, the potential of the grid of triode 4' is greater than that of A' at the time of sampling, a reverse action occurs. Due to the extremely high gain of the differential amplifier and the additional high gain of the direct amplifier, the difference between the potential of the grid of triode 4' and that appearing at terminal A' at the time of gating is made very small with the ultimate result that at terminal T, connected directly to the grid of triode 4', there will appear to a very high degree of accuracy the potential of the input waveform at the instant of sampling.

The integrating actions which are involved may be whatever is desired for the particular situation presented. The time constants of the integrating arrangements may be relatively long if it is desired to provide an average sampling over a relatively large number of cycles or relatively short if the sampling is to be provided over only a relatively quite small number of cycles. Generally, in most uses, the waveform repeats substantially identically in successive cycles with only slow changes occurring over a considerable number of cycles. Under such circumstances, extremely accurate sampling results may be secured of the order indicated above. As will be evident from the description of the operation, variations of gating pulse width will have no effect unless the duration of the gating pulse encompasses a substantial change of amplitude of the waveform being sampled.

In view of the feed-back arrangement provided, the effective output impedance at terminal T is very low, and may be of the order of less than one ohm.

A further example of the utilization of the circuits described above is found in Figure 9 which shows a circuit adapted for the production of a "functional capacitance" i. e., a capacitance which varies as a given function of a variable which may be, for example, time or some arbitrary or scheduled potential. Use for such a capacitance arises at times in the matter of formulation of analogs. The capacitance thus required may be either positive or negative or may well vary between positive and negative values.

At 202 there is indicated a terminal between which and ground the functional capacitance is to be provided. At 204 there is indicated a function generator which may be of one of the types described in Patterson application, Serial No. 188,291, filed October 4, 1950, or in Patterson and Yetter application, Serial No. 239,278, now Patent No. 2,793,320, filed July 30, 1951. As pointed out in said applications, an input potential $E_x$ which may be assumed applied to a terminal 206 will give rise at an output terminal, indicated at 208, to a potential which is some arbitrary predetermined function of the potential $E_x$ which output is here designated as $F(E_x)$. The output potential at 208 is delivered to the terminal L of a multiplication circuit 210 such as that of Figure 6, the other two terminals K and P of which are indicated. To the terminal K there is delivered the potential E from the terminal 202.

Figure 9:
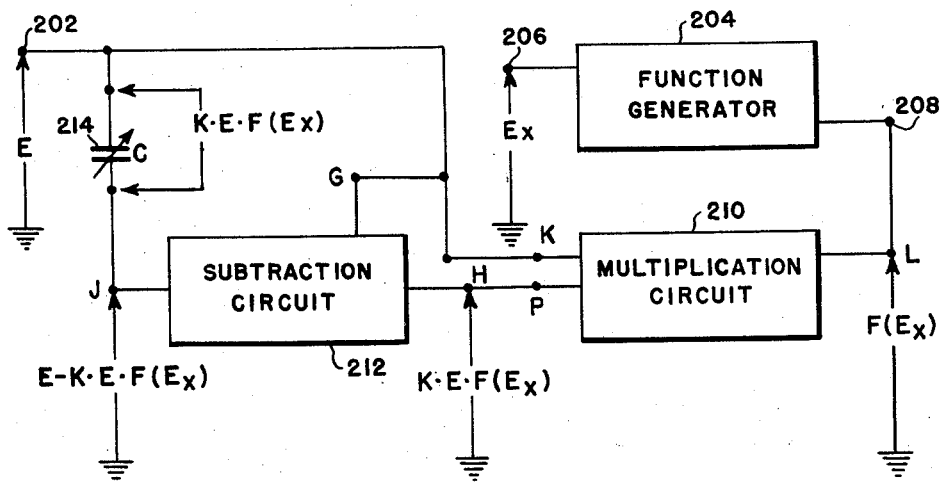
Figure 9 is a diagram showing the construction of a circuit which provides an impedance varying as the function of an independent variable or, alternatively, which may be used for the provision of a charge varying as the function of an independent variable.

The output terminal P of the multiplication circuit 210 delivers to the input terminal H of the subtraction circuit 212 of the type illustrated in Figure 2 a potential as indicated in Figure 9 which is a product of the potential E and the functional potential from the function generator multiplied by a constant K which is, of course, subject to adjustment. To the terminal G of the subtraction circuit the potential E is applied from the terminal 202 with the resulting output at J of the difference potential as indicated in Figure 9. Between the terminals 202 and J there is connected the physical capacitance 214 having a value C and, in many cases, desirably adjustable.

The two equations following the diagram in Figure 9 indicate the nature of the derivation of the apparent capacitance between terminal 202 and ground. The first equation gives the charge which exists on the condenser 214, this charge being the product of the actual capacity of this condenser and the potential between its terminals. The apparent capacity between terminal 202 and ground $C_x$ is then given by the quotient of this value of $q$ and the potential E between the terminal 202 and ground and it will be evident that this apparent capacity is the product of C and K with the function generated by the function generator. C and K, both of either of which may be adjustable, merely determine the scale factor involved. It will be evident that the function may be applied negatively to the terminal L and, consequently, the apparent capacitance may be either positive or negative. Even more generally, the function may vary through zero in which case the apparent capacitance may also vary through zero. In this connection, it should be noted that, generally speaking, it is the dynamic value of such capacitance which is of interest so that no loss of generality of result is occasioned by the addition of constant potentials such as may be required to provide a range through zero of operation of the circuit components.

Sometimes, there is required rather than a functional capacitance a "functional charge," that is, a charge appearing between terminals which varies as a function of some variable for example either time or some potential which may be dependent upon some other variable. Such a functional charge may be readily obtained by what amounts to a simplification of the circuit illustrated in Figure 9 by omission of the multiplication circuit and the delivery from terminal 208 of the function generator directly to terminal H of the subtraction circuit of the function which is generated by the generator. In such case it will be evident that the apparent charge appearing between terminal 202 and ground will be that of the first expression below the circuit of Figure 9 with the value of E equal to unity. A positive sense of charge is thus secured. However, if instead of the subtraction circuit, there is provided an addition circuit such as that of Figure 5, then the value of the charge $q$ will be numerically the same but of negative sign.

It will be further evident that special cases of function generation will give rise to particular types of apparent capacitances of special utility. $E_x$ may, for example, well be E, in which case the capacitance (or charge) may be an arbitrary function of E. In this case, of course, the multiplication circuit may well be omitted, the output of the function generator being applied directly to terminal H of the subtraction circuit. But the subtraction circuit may also be omitted if a suitable function is generated, so that, still more simply, the function generator may have its output connected directly to the lower terminal of condenser 214. Such connection will generally involve a cathode follower type of amplifier of low output impedance such as described hereafter.

It may also be noted that while a capacitance is indicated at 214, this is merely representative of a general impedance which may be quite arbitrary, being, for example, a resistance, inductance, any combination of resistance and reactance elements, a transmission line having lumped or distributed parameters, or the like. In general, such an impedance may be made functionally dependent upon a potential.

Of particular importance, however, is a circuit capable of providing a continuously variable capacitance of high capacity value. Structural size seriously limits the capacity of variable condensers. But occasions arise where large variable capacities are called for and the best that could heretofore be provided involved the use of sets of condensers selectively switched to provide steps of change. In accordance with the present invention there may be provided a continuously variable capacitance of high capacity value.

Involved as an element of such capacitance is, desirably, a cathode follower of low output impedance, and since such a follower is of more general utility and furnishes a further example of the applicability of the differential amplifier of Figure 1, it will first be described.

Figure 10:
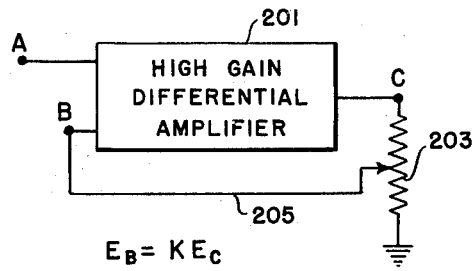
Figure 10 is a diagram showing a cathode follower circuit having very low output impedance and utilizing a high gain differential amplifier of the type illustrated in Figure 1.

A high gain differential amplifier of the type shown in Figure 1 (but which may be, for example, of the type shown in Figure 8) is indicated at 201 in Figure 10. The terminal C is connected to ground through the resistance 203 of a potentiometer, the adjustable contact of which is connected at 205 to terminal B. The result is to apply at terminal B a potential which is K times that at C, K being equal to or less than unity. It will be evident that for an input at A there will be provided at C an output given by the second equation of Figure 10. If $\mu$ is large, as described above, K is substantially the factor of proportionality, being unity if terminal C is directly connected to terminal B.

The advantages of this circuit lie in its extremely low output impedance and its high degree of independence of tube characteristics. For these reasons it is of general utility; for example, it may be used to drive low impedance devices, such as speaker coils without the use of a transformer.

Furthermore, it may be noted that the circuit in Figure 10 provides a high precision linear amplifier having a definite gain set by the value of K which depends only on the values of the resistances appearing above and below the potentiometer contact. These resistances may be accurately fixed by the use of precision resistors joined to a terminal replacing the potentiometer contact.

Figure 11:
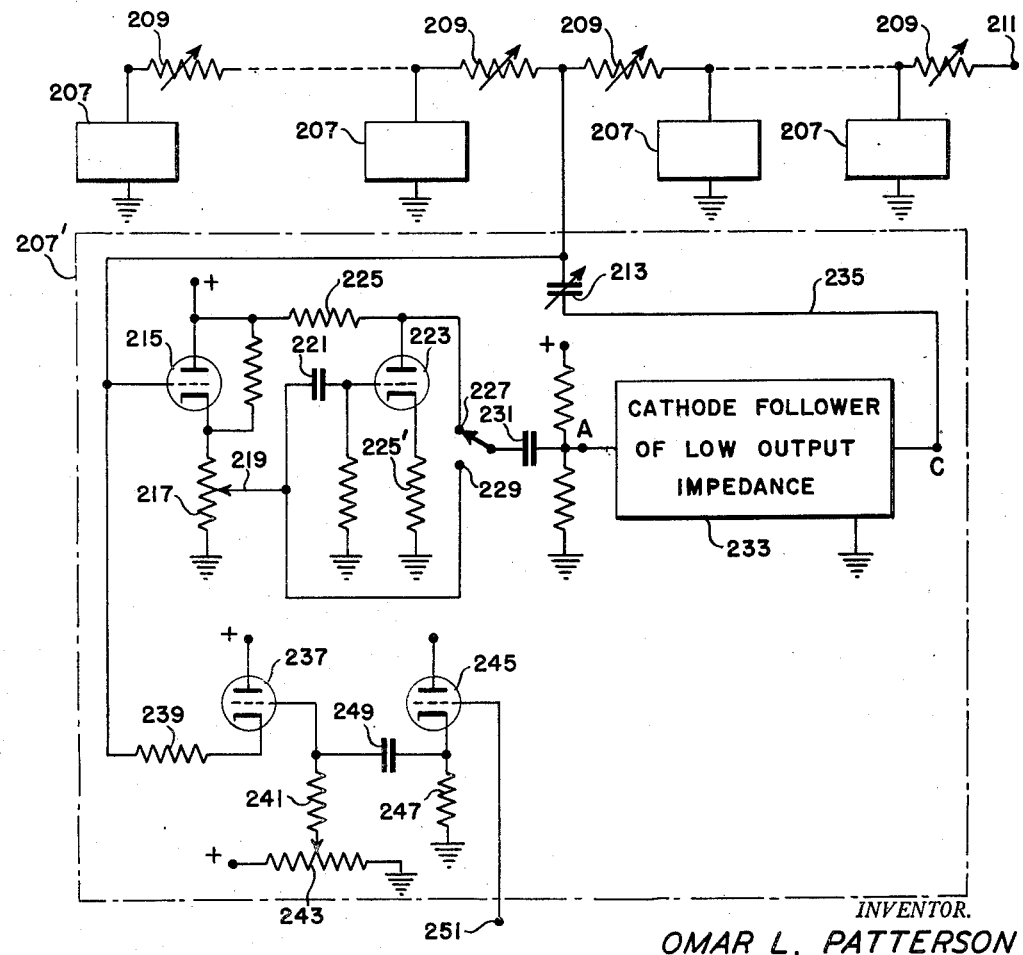
Figure 11 is a diagram showing a water drive network suitable for use in an oil reservoir analyzer and specifically incorporating means for providing continuously variable capacitances of high value.

The arrangement for providing a variable capacitance is illustrated in Figure 11 embodied in a water drive analog the utilization of which is more fully described in my application Ser. No. 196,480. Said application illustrates and describes a variable capacitance arrangement which is similar to that about to be described except for the difference involved in the cathode follower portion of the circuit.

The water drive analog comprises a series of resistances 209, the junctions of which are connected to ground through capacity elements which are indicated at 207. In view of the fact that these capacity elements require a wide range of adjustment and relatively high capacity values, there are used in this network dynamic capacity elements which are similar to each other so that only one of these is detailed at 207', it being understod that all of the individual elements 207 are constructed as illustrated at 207'. The resistances 209 of the network are shown as variable but, in practice, there are preferably used, instead of continuously variable resistors, sets of resistors which are chosen into the circuit by switching. In the same fashion, the condenser 213 is shown as variable but since these condensers 213 are of relatively large capacity values in the particular use here illustrated, it is preferable in actual practice to utilize groups of fixed condensers which are selectively switched into the circuit. It is also generally desirable to provide resistance and capacity units which may, as a whole, be switched into and out of the circuit. However, such details are arbitrary and are not illustrated. Generally, for good reproduction of an actual water drive network, a considerable number of network sections are involved. There may, for example, be fifteen or more of these sections, and the multiplicity is indicated by the use of dotted lines in the showing of the network.

Referring now particularly to the capacitance element indicated at 207' (which also includes a charging arrangement), it will be noted that each such element comprises a condenser 213 connected to the corresponding junction between resistances 209 of a pair. The value of the capacity provided by the condenser 213 may be alternatively divided or multiplied. The range for each condenser, for example, may be from about one-tenth to about fifty times its capacity value and it will be evident, therefore, that by the use of a limited number of interchangeable condensers, a very large range of capacities may be provided. As will appear, the adjustments of capacity are continuous. tI is not necessary in practice to have the resistances of the network continuously variable so that a reasonable number of fixed resistances may be provided and switched into the circuit as indicated above.

The upper terminal of the condenser 213 is connected to the grid of a triode 215 in a cathode follower arrangement, there being provided between the cathode and ground a potentiometer resistance 217 associated with a variable contact 219. This variable contact arrangement provides between the contact 219 and ground a potential varying from approximately the value of the potential between the grid and ground to some limiting fraction thereof as, for example, one-tenth the value of the grid potential. A condenser 221 connects the contact 219 to the grid of an amplifying triode 223. This triode is associated with an anode load resistor 225 and the cathode is connected to ground through a cathode resistor 225'. The amplification of the amplifier just described may be set by a proper choice of the cathode resistor 225'. This amplification may vary, for example, from unity to about fifty. The anode of triode 223 is connected to a contact 227 engageable by a switch arm which is alternatively engageable with contact 229 connected to the potentiometer contact 219.

Considering the arrangement so far described, assume that the switch engages contact 229. It will then be evident that at the switch there will appear a potential which may vary from approximately the value of the potential of the grid of triode 215 to some small fraction thereof depending upon adjustment of potentiometer contact 219. Division of the potential appearing at the grid of triode 215 is thus effected, the potential of the switch being the same as that of the grid. On the other hand, if the switch engages contact 227 the output at the potentiometer contact 219 is amplified to the degree afforded by the amplifier including triode 223 and the potential appearing at the switch will be of a sign opposite that appearing at the grid of triode 215, or, in other words, the phase of the input is reversed. In short, considering both adjustments of the switch, the inphase output of the arrangement may be any chosen fraction of the input or, alternatively, the out-of phase value of the output may be either a fraction or a multiple of the input. As will be evident from consideration of the use of the network being described in an analog, a repetition cycle is involved so that only alternating signals need be considered, these being delivered from the switch through condenser 231.

A cathode follower of low output impedance is illustrated at 233 and may be of the type shown and described with reference to Figure 10. Alternatively, for many purposes, it is sufficient to use a cathode follower of less accurate type and of somewhat higher output impedance such as described in my application, Ser. No. 196,480. Considering, however, that the cathode follower at 233 is of the type illustrated in Figure 10, the condenser 231 provides its output to terminal A and the cathode follower output at terminal C is connected through line 235 to the lower terminal of condenser 213.

The cathode follower provides a very accurate correspondence of input to output potential irrespective of output current drain by reason of its low output impedance. The condenser 213 constitutes a load on the cathode follower circuit and it is very important that the output should be linearly related to a high degree of accuracy to the input in order that the effective dynamic capacity will be constant irrespective of the charges or currents which are involved. This last result cannot be secured to a sufficient degree of accuracy with an ordinary cathode follower and, hence, there is used the cathode follower circuit of Figure 10 or such a cathode follower circuit as is described in said prior application Ser. No. 196,480.

That the arrangement above described constitutes a continuously variable condenser may now be made clear. If the switch engages contact 229, the potential fed to the lower terminal of condenser 213 will be of the same sign as the potential fed to the upper terminal of this condenser so that there will appear across the condenser 213 a potential which is some fraction of the potential between its upper terminal and ground. Accordingly, there is secured an effective capacity having a fraction of the capacity of the condenser 213, the value of this fraction being determined by the setting of potentiometer contact 219 and being continuously variable with the continuous variation of this contact. On the other hand, consider the switch in engagement with contact 227. There is then applied to the lower terminal of the condenser 213 a potential which is of opposite phase with respect to the potential applied to the upper terminal of this condenser and this potential applied to the lower terminal may be either a fraction or a multiple of the potential applied to the upper terminal depending upon the choice of resistance 225′ and the setting of the potentiometer contact 219. Accordingly, the potential across the condenser will exceed the potential of its upper terminal with respect to ground and this potential across the condenser will be continuously variable with adjustment of contact 219. In view of this, it will be evident that the system provides what amounts to a multiplication of the capacity appearing between the upper terminal of condenser 213 and ground as compared with the physical capacity of the chosen condenser at 213.

The dynamic capacity afforded by the arrangement just described is of quite general applicability. The potentiometer in the cathode circuit of triode 215 may be directly calibrated in terms of continuous variations of capacitance and, in view of the fact that a large condenser of high grade and small leakage, for example, of the order of two microfarads or more, may be provided at 213, it will be evident that there may be provided an adjustable capacitance which may have an effective capacity of the order of several hundred microfarads. Such a dynamic capacitance may be used, for example, for filtering. Furthermore, in view of the inherent negative feed-back involved, there is a very low effective series resistance so that, when used as a filter, low impedance filtering will not be impaired.

This is in contrast with the normal difficulty of securing high capacitances without leakage and, of course, of securing continuous variability of capacitances of high value.

The remaining portion of the apparatus indicated at 207′ has to do with the initial charging of the capacitances in the network prior to a zero time of the repetitive cycle of an anlyzer or analog such as described in said application, Ser. No. 196,480, now Patent No. 2,788,938.

The charging is effected through a triode indicated at 237 which has its cathode connected through resistance 239 to the upper terminal of condenser 213. The grid of triode 237 is connected through resistance 241 to the contact of a potentiometer 243 which is connected between the positive potential supply line and ground. The grid of triode 237 is connected through condenser 249 to the cathode of a triode 245 in a cathode follower arrangement including the cathode load resistor 247. The grid of triode 245 is connected to a terminal 251 which, as will appear from said application, Ser. No. 196,480, is connected to a source of positive square waves of a timing circuit, the applied wave having a duration, for example, of 2000 microseconds in a preferred arrangement of the apparatus.

In view of the presence of condenser 249, it will be evident that the grid of triode 237 is subjected to a potential which varies as a square wave about a constant potential set by the position of the contact on potentiometer 243. The square wave is of accurately regulated amplitude and it will be evident that during the positive cycles of this wave the potential at the grid will be positive so that the triode 237 will be conducting and will charge the condenser 213, or rather the effective dynamic capacitance which has been described, to a potential at its upper terminal with respect to ground corresponding to the sum of the potential of the potentiometer contact and half the complete amplitude of the square wave, the current carrying capacity of triode 237 being sufficient to permit full charging during the positive half cycle of the square wave. On the other hand, during the negative half cycle of the square wave, the grid of triode 237 will be driven to cut off and the network will then deliver current through the withdrawal circuit of the type described in said prior application.

While the elements including and to the right of condenser 249 are indicated as repeated in each of the assemblies 207′, in practice, such repetition is unnecessary and this portion of the circuit may be provided only once for a group of the assemblies 207′. In such case, the triode 245 must be provided with adequate current carrying capacity and, to this end, the single triode indicated at 245 may be replaced by two or more triodes connected in parallel.

The terminal 211 is the output terminal of the network and is connected as described in said application, Ser. No. 196,480, now Patent No. 2,788,938.

A further example of the use of the elements heretofore described is afforded by the oil reservoir analyzer illustrated in Figure 12. This analog in itself forms a part of the present invention.

In the analyzer of application Ser. No. 196,480, now Patent No. 2,788,938, there are provided analogs of a water drive and of a gas cap which account, usually, for the maintenance of pressure on the oil zone. Furthermore, in said application there are described the procedures to be adopted to take into account the results of dissolved gas, though the analyzer, as disclosed, does not provide an analog for the dissolved gas behavior. Figure 12 illustrates an analog which involves solution of the reservoir material balance equation including dissolved gas.

Referring to Figure 12, there is indicated a water drive analog 216 having an output terminal 218. This analog may be of the type shown in Figure 11. The terminal 218 at which there appears a potential $E_p$ corresponding in magnitude to the pressure on the oil in the reservoir, is connected at 234 to an analog which will now be described. As will appear, this analog involves various of the calculating devices heretofore described.

It may be here noted that the timing circuits for controlling the repeated cycles of the analyzer are not shown in Figure 12, but it will be understood that these are as fully described in said application, Serial Number 196,480, now Patent No. 2,788,938.

The analog is required to provide a solution to the equation which is given in Figure 12 in representation of the output of the addition circuit 250 along the connection 272. This is the equation of volumetric balance which is an equation of continuity applicable to a complete reservoir including water, free gas, dissolved gas and oil. In this equation the various quantities have the following significance:

$V$=volume in barrels of pore space in reservoir originally occupied by oil and gas=$nu_0+mnu_0$, a constant.

$n$=original amount of oil in reservoir in barrels as measured in the stock tank at 60° F., a constant.

$\Delta n$=cumulative volume of oil produced in barrels as measured in the stock tank at 60° F., an independent variable.

$u_0$ = barrels of oil under original reservoir conditions which yield one barrel of stock tank oil at 60° F., a constant.

$u$ = volume of oil and of gas released from solution, in barrels, at any pressure P, resulting from $u_0$ barrels of original reservoir oil, a function of P.

$r_n$ = net cumulative produced gas-oil ratio (less any injected gas) in cubic feet at 60° F. and indicated base pressure per barrel of stock tank oil at 60° F., an independent variable.

$r_0$ = original dissolved gas-oil ratio, in same units as $r_n$, a constant.

$v$ = barrels of gas at reservoir conditions per cubic foot of gas at 60° F. and indicated base pressure, a function of P.

$v_0$ = the value of $v$ at the original temperature and pressure, a constant.

$m$ = ratio of volume of reservoir originally occupied by free gas to that originally occupied by oil, a constant.

$z$ = cumulative water production in barrels, an independent variable.

$Z$ = cumulative water influx into reservoir in barrels, a dependent variable.

$I_w$ = rate of water influx into reservoir in barrels, a dependent variable.

The analog must provide at terminal 218 a current withdrawal corresponding to the rate of water influx into the reservoir which is the first derivative of Z with respect to time.

In view of the fact that the elements of this analog have, in general, been already described as to circuit details, this analog is largely presented by way of a block diagram indicating in particular the generation of, and various combining steps for, the elements of the volumetric balance equation.

As indicated in the above listing of significance of the quantities involved, some of these are constants, some are independent variables subject to choice to accord with operation with the reservoir and still others are functions of pressure appearing at the withdrawal point of the reservoir, the analog of which is terminal 218.

A potentiometer 236 connected between a source of positive potential and ground has a contact 238 which is variable to provide a potential corresponding to the constant $n$. As will become evident, the quantities in the volumetric balance equation are represented by potentials which are proportional to their numerical values.

The contact at 238 provides an input to the subtraction circuit 240 which also receives an input, as indicated, from a cumulative oil production function generator 242. The difference of these inputs is fed to the multiplication circuit 244 which also receives an input from the generator for the quantity $u$ indicated at 246. Since $u$ is a function of $E_p$ the generator 246 is so controlled as to give a proper functional output dependent on the input potential $E_p$. The two inputs from the multiplication circuit are multiplied together and delivered therefrom through connection 248 to an addition circuit 250.

A potentiometer 252 connected between a positive potential source and ground provides at its variable contact 254 a potential corresponding to the product which is indicated in Figure 12 and which is a constant for a particular operation of the analyzer. The potential at 254 is fed to the subtraction circuit 256.

A cumulative produced gas-oil ratio function generator 258 provides an output to a multiplication circuit 260 which receives at 262 the output of the cumulative oil production function generator 242. The product of the two inputs to the multiplication circuit 260 is delivered to the subtraction circuit 256 and the difference of these inputs is delivered to the multiplication circuit 264 where it is multiplied by the output from a generator for $v$ indicated at 266 which is controlled by the potential at terminal 218 inasmuch as $v$ is a function of pressure in the reservoir. The output of multiplication circuit 264 is delivered through connection 268 to the addition circuit 250.

A cumulative water production function generator 270 provides an output $-z$ which is also delivered to the addition circuit 250. By following the various terms indicated in Figure 12 it will be evident that the output at 272 from the addition circuit 250 will be equal to the expression at the right-hand side of the equation which is written adjacent to the output line 272. This expression is equal to $V-Z$. The output of the addition circuit is fed to a variable gain amplifier 274 which takes the form of a multiplying circuit, the gain of which is controlled by an element indicated at 276 which provides a manual or automatic electrical signal corresponding to K. The gain control thus afforded provides for changing of the scale factor relating electric charge and volume in the reservoir and the control may be by an electrical signal so that the scale factor may obey any desired relationship, for example, either being a constant, or corresponding to the maintenance of the pressure potential drop during a given time interval constant regardless of changes in any of the reservoir or water drive parameters.

The output from the variable gain amplifier 274 is provided to an addition circuit 278 which has also fed thereinto the potential $E_p$ of terminal 218. The output of the addition circuit is connected to the lower terminal of condenser 284 through line 282, the upper terminal of this condenser being connected at 286 to the terminal 218. It will be evident that the potential across the condenser 284 will be $k(V-Z)$. The condenser 284 involves differentiation so that the current $I_w$ flowing from terminal 218 to the condenser will be given by the expression indicated, the capacity C of the condenser entering into the expression as a constant.

The addition, subtraction and multiplication circuits illustrated in Figure 12 require no further description since they may be of the respective types described in detail above. The variable gain amplifier 274 may be of any ordinary type. The several cumulative production generators 242, 270 and 258 may be of types described in detail in my application Serial No. 196,480, now patent No. 2,788,938, and will, in general, involve step function generators combined with integrators to give rise to cumulative outputs. In fact, the two generators 242 and 270 may be of the type described in said application as the production function generator followed by integrators of the nature of the gas cap function integrator described in said application. The cumulative produced gas-oil ratio function generator 258 may be of similar nature but, as indicated by the dotted line 259, this may, if desired, be a function generator controlled by the potential $E_p$ and would then be of the same type as the function generators 246 and 266.

These function generators 246 and 266 may be of the types described in said Patterson application Serial No. 188,291 or said Patterson and Yetter application Serial No. 239,278, now patent No. 2,793,320. Each of them will produce an output which is a predetermined function of the input potential $E_p$.

From the foregoing it will be evident that the potential drop at the terminal 218 will be properly affected by the analog just described to solve the material balance equation.

Figure 13:
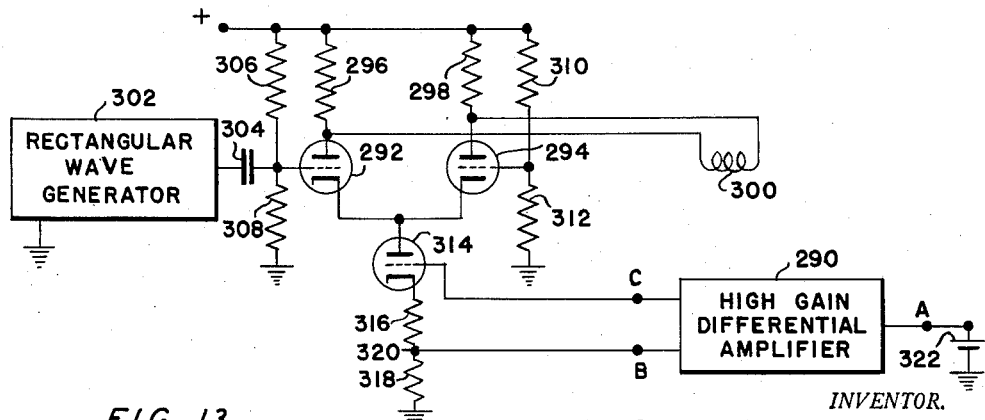
Figure 13 is a diagram illustrating a circuit for the generation of rectangular waves of constant and equal amplitude.

A further application of a high gain differential amplifier is illustrated in Figure 13 which shows an arrangement for providing rectangular waves of equal amplitude and of constant amplitude. Ordinary rectangular wave generators produce, at best, rectangular waves of only approximately equal and constant amplitude. Occasions arise, however, where constancy and uniformity of amplitude of rectangular waves is required, particularly where the durations of the waves are of primary significance and it is necessary to eliminate variations of amplitude which would constitute a disturbing factor. For example, in the elevation meter described in the application of Johnson and Mayes, Serial No. 776,250, now patent No. 2,647,323, filed September 26, 1947, it is necessary to provide to a pendulum coil rectangular waves for the purpose of positioning such coil on the average in a particular relationship to a datum member in opposition to forces tending toward its displacement. In this elevation meter measurements of the restoring force on the pendulum are dependent upon the duration of such rectangular waves or pulses, and it is necessary for accuracy of results that the amplitude of the rectangular waves should be constant to a high degree of precision.

The circuit of Figure 13 achieves this result. A high gain differential amplifier of the type illustrated in Figure 1 is shown at 290 provided with terminals A, B and C corresponding to those of that figure.

A pair of triodes 292 and 294 have their anodes connected respectively to a positive potential supply line through accurately equal resistances 296 and 298. The anodes of these triodes provide between them the output which is illustrated as delivered to a coil 300 which may, for example, be the pendulum coil of said Johnson and Mayes application though obviously the output may be delivered to any other device requiring rectangular waves of constant and equal amplitude.

A rectangular wave generator indicated at 302 may be of a multivibrator type capable of providing approximately rectangular waves. The particular generator here involved is not important but its output should be such as to drive the triodes 292 and 294 alternately to cut off. The rectangular wave generator is connected to the grid of triode 292 through condenser 304 in a single-ended drive arrangement though, as will be evident, the arrangement could be double-ended and provided to the grids of both of these triodes. A suitable normal potential is applied to the grid of triode 292 through the use of potential dropping resistors 306 and 308, and a similar potential is applied to the grid of triode 294 through the similar potential dropping resistors 310 and 312.

The cathodes of triodes 292 and 294 are connected together and to the anode of a triode 314 the cathode of which is connected to ground through a pair of resistors 316 and 318 constituting a potential dropping arrangement. The junction 320 of the last mentioned resistors is connected to terminal B of the differential amplifier. The grid of triode 314 is connected to the terminal C of the differential amplifier. The terminal A of the differential amplifier is connected to the positive pole of a standard cell 322 or to a positive potential terminal of some other constant potential source.

The operation of the rectangular wave generator is as follows:

The source 302 drives the triodes 292 and 294 alternately to cut-off. At all times, however, the total current through both triodes, actually the current through each at a time, is constant by reason of the fact that terminal 320 is maintained at a constant potential above ground equal to the potential at terminal A by the action of the high gain differential amplifier which controls the grid potential of triode 314 to maintain constant cathode current flow irrespective of any possible variations of anode potential. The result is that the current through each triode 292 and 294 when conducting is maintained constant and since resistances 296 and 298 are equal it follows that the positive and negative flows of current through the output device, such as coil 300, will be accurately equal. Furthermore, the current flows will be constant by virtue of the maintenance of constant potential and current conditions through the actions of the circuit elements just described. The circuit is essentially independent of drifts of tube characteristics and, consequently, constant amplitude of the square waves may be maintained over extended periods of time such as would be necessary, for example, in the elevation meter of said Johnson and Mayes application.

There have been disclosed above for the various circuits constructions leading to very high accuracy and a high degree of independence of tube characteristics. It will be evident, however, that without departing from various inventions involved, certain elements of these circuits, where extreme accuracy or independence of tube characteristics may not be involved, may be of types other than those disclosed. For example, while the high gain differential amplifier of Figure 1 is preferred, this differential amplifier may be replaced by differential amplifiers of less gain or of inferior characteristics in particular cases. For example, the amplifying triodes 16 and 18 may be omitted, the output tube 36 being fed directly by one of the triodes 2 or 4. The constant current arrangement of triode 10 may also be omitted or replaced by an approximate constant current device such as a pentode, or the like. It is to be understood, therefore, that the foregoing specific disclosure is not to be regarded as limiting the inventions involved beyond the scopes of the appended claims.

In the foregoing triodes have been specifically mentioned as the tubes used in most instances but it will be evident that in many cases these might be replaced with tetrodes, pentodes, or other multi-element tubes. The term "triode" is accordingly to be regarded as broadly descriptive, in the claims, of true triodes as well as tubes having additional elements, provided they contain elements performing, in the particular instances involved, similarly or equivalently to the anode, the cathode and the control grid of a triode.

What is claimed is:

1. An oil reservoir analyzer comprising a terminal; a resistance-capacitance network constituting an electrical water drive analog connected to said terminal and providing current flow thereat; means for initially charging said network; and an analog connected to said terminal to control flow of current at said terminal in accordance with the material balance equation of an oil reservoir, the last mentioned analog comprising: a first generator, controlled by the potential at said terminal, of a potential corresponding to volume of oil and of gas released from solution; a second generator, controlled by the potential at said terminal, of a potential corresponding to volume of gas at reservoir conditions per unit volume of gas at standard conditions; a third generator of a potential corresponding to cumulative volume of oil produced; a fourth generator of a potential corresponding to cumulative volume of water produced; a fifth generator, controlled by the potential at said terminal, of a potential corresponding to the cumulative produced gas to oil ratio; and calculating elements relating said potentials, said calculating elements comprising: a first means providing a potential corresponding to the original amount of oil in the reservoir; a first subtraction circuit having inputs from said first means and from said third generator and providing a potential corresponding to the difference of the former of its inputs minus the latter; a first multiplication circuit having inputs from said first subtraction circuit and from said first generator and providing a potential corresponding to the product of its inputs; a second means providing a constant potential; a second multiplication circuit having inputs from said third generator and from said fifth generator and providing a potential corresponding to the product of its inputs; a second subtraction circuit having inputs from said second means and said second multiplication circuit and providing a potential corresponding to the difference of the former of its inputs minus the latter; a third multiplication circuit having inputs from said second generator and from said second subtraction circuit and providing a potential corresponding to the product of its inputs; a first addition circuit adding the outputs from the first multiplication circuit, from the third multiplication circuit, and from said fourth generator, and providing a potential corresponding to the sum of its inputs; a variable gain amplifier receiving the output from said first addition circuit; a second addition circuit adding the output potential from said amplifier and the potential of said terminal; and a capacitance connected between said terminal and the output of said second addition circuit.

2. An oil reservoir analyzer comprising a terminal; a resistance-capacitance network constituting an electrical water drive analog connected to said terminal and providing current flow thereat; means for initially charging said network; and an analog connected to said terminal to control flow of current at said terminal in accordance with the material balance equation of an oil reservoir, the last mentioned analog comprising: a first generator, controlled by the potential at said terminal, of an output corresponding to volume of oil and of gas released from solution; a second generator, controlled by the potential at said terminal, of an output corresponding to volume of gas at reservoir conditions per unit volume of gas at standard conditions; a third generator of an output corresponding to cumulative volume of oil produced; a fourth generator of an output corresponding to cumulative volume of water produced; a fifth generator, controlled by the potential at said terminal, of an output corresponding to the cumulative produced gas to oil ratio; and calculating elements relating said outputs, said calculating elements comprising: a first means providing an output corresponding to the original amount of oil in the reservoir; a first subtraction circuit having inputs from said first means and from said third generator and providing an output corresponding to the difference of the former of its inputs minus the latter; a first multiplication circuit having inputs from said first subtraction circuit and from said first generator and providing an output corresponding to the product of its inputs; a second means providing a constant output; a second multiplication circuit having inputs from said third generator and from said fifth generator and providing an output corresponding to the product of its inputs; a second subtraction circuit having inputs from said second means and said second multiplication circuit and providing an output corresponding to the difference of the former of its inputs minus the latter; a third multiplication circuit having inputs from said second generator and from said second subtraction circuit and providing an output corresponding to the product of its inputs; a first addition circuit adding the outputs from the first multiplication circuit, from the third multiplication circuit, and from said fourth generator, and providing an output corresponding to the sum of its inputs; a variable gain amplifier receiving the output from said first addition circuit; a second addition circuit adding the output potential from said amplifier and the potential of said terminal; and a capacitance connected between said terminal and the output of said second addition circuit.

3. An oil reservoir analyzer comprising a terminal; a resistance-capacitance network constituting an electrical water drive analog connected to said terminal and providing current flow thereat; means for initially charging said network; and an analog connected to said terminal to control flow of current at said terminal in accordance with the material balance equation of an oil reservoir, the last mentioned analog comprising: a first generator, controlled by the potential at said terminal, of an output corresponding to volume of oil and of gas released from solution; a second generator, controlled by the potential at said terminal, of an output corresponding to volume of gas at reservoir conditions per unit volume of gas at standard conditions; a third generator of an output corresponding to cumulative volume of oil produced; a fourth generator of an output corresponding to cumulative volume of water produced; a fifth generator, of an output corresponding to the cumulative produced gas to oil ratio; and calculating elements relating said outputs, said calculating elements comprising: a first means providing an output corresponding to the original amount of oil in the reservoir; a first subtraction circuit having inputs from said first means and from said third generator and providing an output corresponding to the difference of the former of its inputs minus the latter; a first multiplication circuit having inputs from said first subtraction circuit and from said first generator and providing an output corresponding to the product of its inputs; a second means providing a constant output; a second multiplication circuit having inputs from said third generator and from said fifth generator and providing an output corresponding to the product of its inputs; a second subtraction circuit having inputs from said second means and said second multiplication circuit and providing an output corresponding to the difference of the former of its inputs minus the latter; a third multiplication circuit having inputs from said second generator and from said second subtraction circuit and providing an output corresponding to the product of its inputs; a first addition circuit adding the outputs from the first multiplication circuit, from the third multiplication circuit, and from said fourth generator, and providing an output corresponding to the sum of its inputs; a variable gain amplifier receiving the output from said first addition circuit; a second addition circuit adding the output potential from said amplifier and the potential of said terminal; and a capacitance connected between said terminal and the output of said second addition circuit.

4. An oil reservoir analyzer comprising a terminal; a resistance-capacitance network constituting an electrical water drive analog connected to said terminal and providing current flow thereat; means for initially charging said network; and an analog connected to said terminal to control flow of current at said terminal in accordance with the material balance equation of an oil reservoir, the last mentioned analog comprising: a first generator, controlled by the potential at said terminal, of an output corresponding to volume of oil and of gas released from solution; a second generator, controlled by the potential at said terminal, of an output corresponding to volume of gas at reservoir conditions per unit volume of gas at standard conditions; a third generator of an output corresponding to cumulative volume of oil produced; a fourth generator of an output corresponding to cumulative volume of water produced; a fifth generator, controlled by the potential at said terminal, of an output corresponding to the cumulative produced gas to oil ratio; and calculating elements relating said outputs, said calculating elements comprising: a first means providing an output corresponding to the original amount of oil in the reservoir; a first subtraction circuit having inputs from said first means and from said third generator and providing an output corresponding to the difference of the former of its inputs minus the latter; a first multiplication circuit having inputs from said first subtraction circuit and from said first generator and providing an output corresponding to the product of its inputs; a second means providing a constant output; a second multiplication circuit having inputs from said third generator and from said fifth generator and providing an output corresponding to the product of its inputs; a second subtraction circuit having inputs from said second means and said second multiplication circuit and providing an output corresponding to the difference of the former of its inputs minus the latter; a third multiplication circuit having inputs from said second generator and from said second subtraction circuit and providing an output corresponding to the product of its inputs; a first addition circuit adding the outputs from the first multiplication circuit, from the third multiplication circuit, and from said fourth generator, and providing an output corresponding to the sum of its inputs; an amplifier receiving the output from said first addition circuit; a second addition circuit adding the output potential from said amplifier and the potential of said terminal; and a capacitance connected between said terminal and the output of said second addition circuit.

5. An oil reservoir analyzer comprising a terminal; a resistance-capacitance network constituting an electrical water drive analog connected to said terminal and providing current flow thereat; means for initially charging said network; and an analog connected to said terminal to control flow of current at said terminal in accordance with the material balance equation of an oil reservoir, the last mentioned analog comprising: a first generator, controlled by the potential at said terminal, of an output corresponding to volume of oil and of gas released from solution; a second generator, controlled by the potential at said terminal, of an output corresponding to volume of gas at reservoir conditions per unit volume of gas at standard conditions; a third generator of an output corresponding to cumulative volume of oil produced; a fourth generator of an output corresponding to cumulative volume of water produced; a fifth generator, of an output corresponding to the cumulative produced gas to oil ratio; and calculating elements relating said outputs, said calculating elements comprising: a first means providing an output corresponding to the original amount of oil in the reservoir; a first subtraction circuit having inputs from said first means and from said third generator and providing an output corresponding to the difference of the former of its inputs minus the latter; a first multiplication circuit having inputs from said first subtraction circuit and from said first generator and providing an output corresponding to the product of its inputs; a second means providing a constant output; a second multiplication circuit having inputs from said third generator and from said fifth generator and providing an output corresponding to the product of its inputs; a second subtraction circuit having inputs from said second means and said second multiplication circuit and providing an output corresponding to the difference of the former of its inputs minus the latter; a third multiplication circuit having inputs from said second generator and from said second subtraction circuit and providing an output corresponding to the product of its inputs; a first addition circuit adding the outputs from the first multiplication circuit, from the third multiplication circuit, and from said fourth generator, and providing an output corresponding to the sum of its inputs; an amplifier receiving the output from said first addition circuit; a second addition circuit adding the output potential from said amplifier and the potential of said terminal; and a capacitance connected between said terminal and the output of said second addition circuit.

6. An oil reservoir analyzer comprising a terminal; a resistance-capacitance network means constituting an electrical water drive analog connected to said terminal and providing current flow thereat; means for initially charging said network; and means constituting an analog connected to said terminal to control flow of current at said terminal proportional to $$\frac{dZ}{dt}$$

and in accordance with the material balance equation of an oil reservoir:

$$V - Z = u(n - \Delta n) + v\left[\frac{mnu_0}{v_0} - \Delta n(r_n - r_0)\right] - z$$

wherein V is the volume of pore space in the reservoir originally occupied by oil and gas, Z is the cumulative volume of water influx into the reservoir, $u_0$ is the volume of oil under original reservoir conditions which would yield a unit volume of stock tank oil at a standard temperature, $u$ is the volume of oil and of gas released from solution at any pressure resulting from the volume $u_0$ of oil under original reservoir conditions, $n$ is the original volume of oil in the reservoir measured as stock tank oil at said standard temperature, $\Delta n$ is the cumulative volume of oil produced measured as stock tank oil at said standard temperature, $v$ is the volume of gas at reservoir conditions per unit volume of gas at said standard temperature and pressure, $v_0$ is the value of $v$ at said standard temperature and pressure, $m$ is the ratio of volume of the reservoir originally occupied by free gas to the volume originally occupied by oil, $r_n$ is the net cumulative produced gas-oil ratio, less any injected gas, in volume at standard temperature and pressure per unit volume of stock tank oil at standard temperature, $r_0$ is the original gas-oil ratio in the same units as $r_n$, and $z$ is the cumulative volume of water production.

7. An oil reservoir analyzer comprising a terminal; a resistance-capacitance network means constituting an electrical water drive analog connected to said terminal and providing current flow thereat; means for initially charging said network; and means constituting an analog connected to said terminal to control flow of current at said terminal proportional to $$\frac{dZ}{dt}$$

and in accordance with the material balance equation of an oil reservoir:

$$V - Z = u(n - \Delta n) + v\left[\frac{mnu_0}{v_0} - \Delta n(r_n - r_0)\right] - z$$

wherein V is the volume of pore space in the reservoir originally occupied by oil and gas, Z is the cumulative volume of water influx into the reservoir, $u_0$ is the volume of oil under original reservoir conditions which would yield a unit volume of stock tank oil at a standard temperature, $u$ is the volume of oil and of gas released from solution at any pressure resulting from the volume $u_0$ of oil under original reservoir conditions, $n$ is the original volume of oil in the reservoir measured as stock tank oil at said standard temperature, $\Delta n$ is the cumulative volume of oil produced measured as stock tank oil at said standard temperature, $v$ is the volume of gas at reservoir conditions per unit volume of gas at said standard temperature and pressure, $v_0$ is the value of $v$ at said standard temperature and pressure, $m$ is the ratio of volume of the reservoir originally occupied by free gas to the volume originally occupied by oil, $r_n$ is the net cumulative produced gas-oil ratio, less any injected gas, in volume at standard temperature and pressure per unit volume of stock tank oil at standard temperature, $r_0$ is the original gas-oil ratio in the same units as $r_n$, and $z$ is the cumulative volume of water production; said last mentioned means constituting an analog comprising a generator of a potential corresponding to volume of oil and of gas released from solution, a generator of a potential corresponding to volume of gas at reservoir conditions per unit volume of gas at standard conditions, a generator of a potential corresponding to cumulative volume of oil produced, a generator of a potential corresponding to cumulative volume of water produced, a generator of a potential corresponding to the cumulative produced gas to oil ratio, and calculating elements relating said potentials in accordance with said material balance equation.

8. An oil reservoir analyzer comprising a terminal; a resistance-capacitance network means constituting an electrical water drive analog connected to said terminal and providing current flow thereat; means for initially charging said network; and means constituting an analog connected to said terminal to control flow of current at said terminal proportional to $$\frac{dZ}{dt}$$

and in accordance with the material balance equation of an oil reservoir:

$$V - Z = u(n - \Delta n) + v\left[\frac{mnu_0}{v_0} - \Delta n(r_n - r_0)\right] - z$$

wherein V is the volume of pore space in the reservoir originally occupied by oil and gas, Z is the cumulative volume of water influx into the reservoir, $u_0$ is the volume of oil under original reservoir conditions which would yield a unit volume of stock tank oil at a standard temperature, $u$ is the volume of oil and of gas released from solution at any pressure resulting from the volume $u_0$ of oil under original reservoir conditions, $n$ is the original volume of oil in the reservoir measured as stock tank oil at said standard temperature, $\Delta n$ is the cumulative volume of oil produced measured as stock tank oil at said standard temperature, $v$ is the volume of gas at reservoir conditions per unit volume of gas at said standard temperature and pressure, $v_0$ is the value of $v$ at said standard temperature and pressure, $m$ is the ratio of volume of the reservoir originally occupied by free gas to the volume originally occupied by oil, $r_n$ is the net cumulative produced gas-oil ratio, less any injected gas, in volume at standard temperature and pressure per unit volume of stock tank oil at standard temperature, $r_0$ is the original gas-oil ratio in the same units as $r_n$, and $z$ is the cumulative volume of water production; said last mentioned means constituting an analog comprising a generator, controlled by the potential at said terminal, of a potential corresponding to volume of oil and of gas released from solution, a generator, controlled by the potential at said terminal, of a potential corresponding to volume of gas at reservoir conditions per unit volume of gas at standard conditions, a generator of a potential corresponding to cumulative volume of oil produced, a generator of a potential corresponding to cumulative volume of water produced, a generator of a potential corresponding to the cumulative produced gas to oil ratio, and calculating elements relating said potentials in accordance with said material balance equation.

References Cited in the file of this patent

UNITED STATES PATENTS

| | | |
|---|---|---|
| 2,324,797 | Norton | July 20, 1943 |
| 2,389,351 | Faulk | Nov. 20, 1945 |
| 2,423,754 | Bruce | July 8, 1947 |
| 2,436,891 | Higinbotham | Mar. 2, 1948 |
| 2,441,387 | Berger | May 11, 1948 |
| 2,442,304 | Mayle | May 25, 1948 |
| 2,458,553 | Boghosian | Jan. 11, 1949 |
| 2,458,599 | Hussey | Jan. 11, 1949 |
| 2,471,262 | Cousins | May 24, 1949 |
| 2,473,432 | Johnston | June 14, 1949 |
| 2,473,457 | Tyson | June 14, 1949 |
| 2,487,510 | Baker | Nov. 8, 1949 |
| 2,496,543 | Kanner | Feb. 7, 1950 |
| 2,511,671 | Jacob | June 13, 1950 |
| 2,533,552 | Brinster | Dec. 12, 1950 |
| 2,542,160 | Stover | Feb. 20, 1951 |
| 2,542,490 | Ehrenfried | Feb. 20, 1951 |
| 2,543,442 | Dench | Feb. 27, 1951 |
| 2,560,170 | Gray | July 10, 1951 |
| 2,569,816 | Lee | Oct. 2, 1951 |
| 2,569,817 | Wolf | Oct. 2, 1951 |
| 2,637,495 | Bubb | May 5, 1953 |
| 2,639,090 | Sherborne | May 16, 1953 |